(12) United States Patent
Nicolaou et al.

(10) Patent No.: US 6,898,509 B2
(45) Date of Patent: May 24, 2005

(54) METHOD OF CONTROLLING AN INTERNAL COMBUSTION ENGINE

(75) Inventors: Michael Nicolaou, Vaihingen (DE); Juergen Neubert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,110

(22) PCT Filed: Feb. 13, 2001

(86) PCT No.: PCT/DE01/00540

§ 371 (c)(1),
(2), (4) Date: Dec. 4, 2002

(87) PCT Pub. No.: WO01/61170

PCT Pub. Date: Aug. 23, 2001

(65) Prior Publication Data

US 2003/0140895 A1 Jul. 31, 2003

(30) Foreign Application Priority Data

Feb. 17, 2000 (DE) .......................... 100 07 207

(51) Int. Cl.⁷ ................................ G06G 7/70
(52) U.S. Cl. ............ 701/110; 701/114; 123/406.16; 123/406.22; 123/406.72
(58) Field of Search ................... 701/114, 115; 123/400.15, 406.21, 406.22, 406.29, 406.23, 406.72

(56) References Cited

U.S. PATENT DOCUMENTS 6,651,624 B2 * 11/2003 Gaessler et al. ............ 123/435

2002/0195084 A1 * 12/2002 Denz et al. .................. 123/350
2003/0098012 A1 * 5/2003 Wild et al. .................. 123/350

FOREIGN PATENT DOCUMENTS

| DE | 196 51 238 A | 6/1998 |
| DE | 197 15 774 A | 10/1998 |
| DE | 197 40 365 A1 | 3/1999 |

OTHER PUBLICATIONS

Patent Abstracts of Japan, vol. 010, No. 130 (M–478), May 14, 1986, (JP 60 256539 A (Nippon Denso KK), Dec. 18, 1985, abstract).

* cited by examiner

*Primary Examiner*—Willis R. Wolfe
*Assistant Examiner*—Johnny H. Hoang
(74) *Attorney, Agent, or Firm*—Kenyon & Kenyon

(57) ABSTRACT

A method of controlling an internal combustion engine is provided, in which at least two operating states are differentiated, at least one operating variable of the engine being controlled, a setpoint torque being predetermined on the basis of the optimum operating point for the respective operating state and on the basis of the position of a throttle valve operated by the driver, and the value of at least one operating variable to be output being determined from the setpoint torque. A cylinder-individual firing angle retardation value is predetermined by a knock control system, so that the cylinder-individual firing angle retardation value is taken into account directly in calculating the setpoint torque.

5 Claims, 2 Drawing Sheets

METHOD OF CONTROLLING AN INTERNAL COMBUSTION ENGINE

FIELD OF THE INVENTION

The present invention relates to a method of controlling an internal combustion engine.

BACKGROUND INFORMATION

A method of controlling an internal combustion engine is discussed in German Patent No. 197 15 774, in which at least one operating variable of the engine is controlled. An example of an operating variable here is the firing angle. The at least one operating variable is determined on the basis of a setpoint torque, which is derived from the optimum operating point for the respective operating state and from the position of the throttle valve operated by the driver. A firing angle retardation resulting from knock control is used to determine a base firing angle efficiency. In certain operating states, however, this base firing angle efficiency is not used to form a setpoint torque, but instead the setpoint torque is determined on the basis of a minimum value selection from efficiency values of other engine characteristic maps. Thus in certain operating states, e.g., idling or partial load, a knock control correction of the setpoint torque and thus also of the firing angle or other operating variables is not adequately ensured.

SUMMARY OF THE INVENTION

The method according to the present invention may have the advantage over the related art that a cylinder-individual firing angle adjustment value derived from knock control may be taken into account directly in determining the setpoint torque and thus for all operating states.

It may be especially advantageous if the firing angle adjustment value for the individual cylinder is first averaged over an engine cycle before the resulting value is used directly to determine the setpoint torque because the setpoint torque is not a cylinder-specific variable and thus the operating variables calculated from the setpoint torque do not represent cylinder-specific values.

It may be advantageous to use the setpoint torque to calculate the firing angle to be output; the firing angle is calculated on the basis of the torque and thus has a knock control correction independently of the operating state of the internal combustion engine.

It may be advantageous that the calculated firing angle is corrected by a value which includes the cylinder-individual knock control correction because in this way the requirements of each individual cylinder may be taken into account. It may be advantageous that the difference between the average of the cylinder-individual firing angle retardation values and the cylinder-individual firing angle retardation value assigned to the particular cylinder is added to a calculated setpoint firing angle. In this way, the firing angle retardation for the individual cylinder may be taken into account without influencing the setpoint torque, which is not a cylinder-individual variable.

In calculating the firing angle retardation value, it may be advantageous that the cylinder-individual firing angle retardation value is composed of an instantaneous firing angle retardation value and an anti-knock value, the cylinder-individual firing angle retardation value being determined on the basis of the knocking signal for the respective cylinder, and the anti-knock value being based on knock prevention in certain operating states or on knock prevention over a longer period of time.

For the starting phase, it may be advantageous to take into account an additional firing angle retardation value for the calculation of the cylinder-individual firing angle retardation value because this may require the temperature of the engine in the cylinder and in the exhaust system.

DETAILED DESCRIPTION

Figure 1:
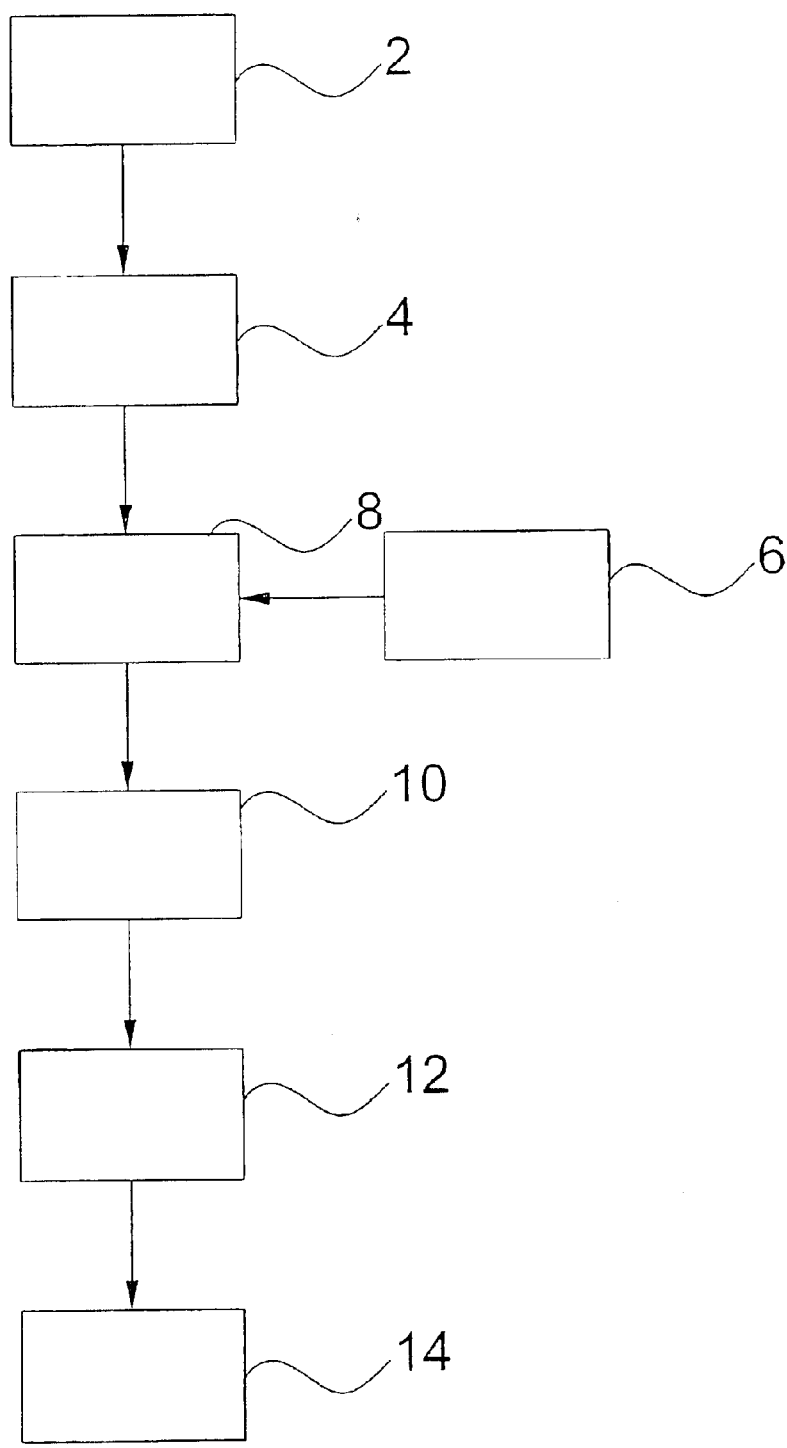
FIG. 1 shows a method of controlling an engine in the form of a flow chart.

FIG. 1 shows a method according to the present invention for controlling an engine on the basis of a flow chart. The starting point for this method in step 2 is pilot control firing angle efficiency eta_zw_vst, which is discussed in German Patent No. 197 15 774 and is determined by a minimum value selection from a predetermined firing angle efficiency and a base firing angle efficiency. In a step 4, using a characteristic curve which will not be described in greater detail here, pilot control firing angle efficiency eta_zw_vst is converted to a respective firing angle which is labeled as dzwvg. In step 6, a cylinder-individual retardation value dzwkrd is supplied by a knock control system. This cylinder-individual retardation value dzwkrd is subtracted in step 8 from firing angle value dzwvg, yielding firing angle difference dzwvgd. In a next step 10 the firing angle difference dzwvgd is averaged over an entire cycle of the engine. This yields the average of firing angle differences dzwvgdm. In a subsequent step 12, this average of firing angle differences dzwvgdm is converted to an efficiency etazwvgd by using a second characteristic curve, which is not described in greater detail here. Setpoint torque mi_fa is calculated by multiplying this efficiency etazwvgd by optimum induced torque mi_opt in a subsequent step 14. Setpoint torque mi_fa is calculated by analogy with the method discussed in German Patent No. 197 15 774, which is described there on the basis of multiplier element 124. It may thus be possible to calculate setpoint torque mi_fa for all operating states by taking into account a firing angle adjustment value from the knock control. Since this method is integrated into the torque-based method of engine control discussed in German Patent No. 197 15 774, it was necessary to start from an efficiency, i.e., pilot control firing angle efficiency mi_zw_vst, and calculate a new efficiency etazwvgd which takes into account the firing angle retardation from the knock control. The conversion to a firing angle in step 4 is necessary because only values of the same type, i.e., firing angles, may be compared. Firing angle differential values dzwvgd are averaged because setpoint torque mi_fa calculated therefrom is an average over an engine cycle and is taken into account as such in calculating other operating variables of the engine. In another embodiment, averaging may also be performed by averaging retardation value dzwkrd just before being subtracted from firing angle value dzwvg.

Figure 2:
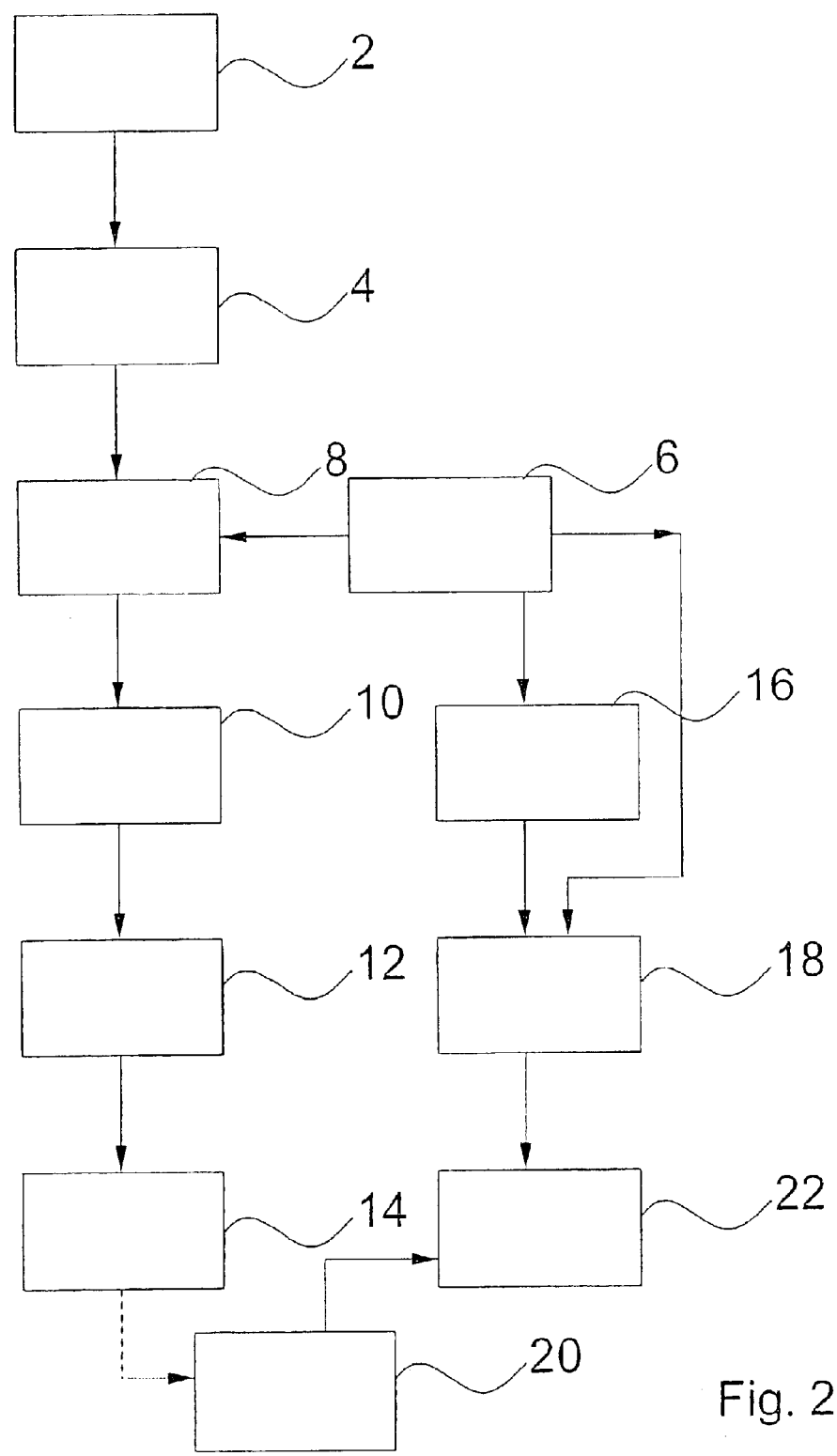
FIG. 2 shows an exemplary method according to the present invention in the form of an additional flow chart.

FIG. 2 illustrates another embodiment of the method according to the present invention for controlling an engine. The method illustrated there includes steps having reference numbers that have already been explained in conjunction with FIG. 1. These steps will not be explained again here because they include the same method steps. In this embodiment, cylinder-individual retardation value dzwkrd is averaged over one engine cycle in step 16. This yields an average value dzwkrdm. In a subsequent step 18, average dzwkrdm determined in step 16 is subtracted from cylinder-individual retardation value dzwkrd, yielding differential value ddzwkrd in step 18. In addition, by analogy with the procedure discussed in German Patent No. 197 15 774, a setpoint firing angle zw_soll is calculated from setpoint torque mi_fa determined in step 14; this procedure is denoted here as step 20. In step 22 the differential value ddzwkrd determined in step 18 is added to this setpoint firing angle, yielding firing angle zw_out to be output. The procedure described on the basis of FIG. 2 then yields the result that a cylinder-individual retardation is performed in the case of a setpoint firing angle in which an average firing angle retardation value has been taken into account. Thus, the properties of the individual cylinders may be taken into account optimally in outputting the firing angle.

In the case of the exemplary embodiments described on the basis of both FIG. 1 and FIG. 2, a cylinder-individual firing angle retardation dwkr, which depends on the operating point, and knock prevention dzwks may be taken into account in an exemplary embodiment in the cylinder-individual retardation value dzwkrd supplied by knock control, in such a manner that values dwkr and dzwks are added to cylinder-individual retardation value dzwkrd. This may ensure that both knock prevention and a firing angle retardation, which is determined from knock control in the respective operating point for the respective cylinder and is derived from certain operating states or a retardation extending over longer periods of time will be taken into account. In particular, a firing angle retardation dzwwl which is also added to values dwkr and dzwks may also be taken into account to yield dzwkrd (i.e., dwkr+dzwks+dzwwl=dzwkrd) so that another firing angle retardation value is taken into account in warming up the engine. This may be necessary because of the temperature conditions prevailing in the cylinder and in the exhaust system of the engine.

What is claimed is:

1. A method of calculating an output firing angle of an internal combustion engine in which a position of a throttle valve is preselected by a driver, comprising:

predetermining a cylinder-individual firing angle retardation value by a knock control system;

calculating a setpoint torque by multiplying a firing angle efficiency value by an optimum torque value, wherein the cylinder-individual firing angle retardation value is taken into account directly in calculating the firing angle efficiency value; and determining a setpoint firing angle from the setpoint torque.

2. The method as recited in claim 1, further comprising:

forming a resulting firing angle retardation value as an average of a plurality of cylinder-individual firing angle retardation values over an engine cycle;

wherein the firing angle efficiency value is determined from the resulting firing angle retardation value.

3. The method as recited in claim 2, wherein the cylinder-individual firing angle retardation value is taken into account in forming the output firing angle, by adding to the setpoint firing angle a difference between an average of the plurality of cylinder-individual firing angle retardation values and the cylinder-individual firing angle retardation value assigned to a particular cylinder.

4. The method as recited in claim 1, wherein the cylinder-individual firing angle retardation value includes an anti-knock value and a firing angle retardation value, the firing angle retardation value depending on an operating point.

5. The method as recited in claim 4, wherein a starting phase retardation value is taken into account for the cylinder-individual firing angle retardation value.

* * * * *